(12) United States Patent
Cluzel

(10) Patent No.: US 6,401,778 B1
(45) Date of Patent: Jun. 11, 2002

(54) CROWN REINFORCEMENT FOR HEAVY DUTY TIRES

(75) Inventor: Guy Cluzel, Beaumont (FR)

(73) Assignee: Compagnie Generale des establissements Michelin-Michelin & Cie, Clermont-Ferrand Cedex (FR)

( * ) Notice: Subject to any disclaimer, the term of this patent is extended or adjusted under 35 U.S.C. 154(b) by 0 days.

(21) Appl. No.: 09/550,667

(22) Filed: Apr. 17, 2000

Related U.S. Application Data

(63) Continuation of application No. PCT/EP98/06798, filed on Oct. 27, 1998.

(30) Foreign Application Priority Data

Nov. 5, 1997 (FR) ............................................. 97 14011

(51) Int. Cl.$^7$ .............................. B60C 9/18; B60C 9/20; B60C 9/22
(52) U.S. Cl. ...................... 152/526; 152/531; 152/532; 152/538; 152/535
(58) Field of Search ................................. 152/526, 527, 152/528, 531, 538, 454, 532, 535

(56) References Cited

U.S. PATENT DOCUMENTS

| | | |
|---|---|---|
| 4,696,335 A | 9/1987 | Tsukagoshi et al. |
| 5,662,752 A | 9/1997 | Nakano |
| 5,738,740 A | 4/1998 | Cluzel |
| 5,772,810 A * | 6/1998 | Cluzel .................. 152/531 |

OTHER PUBLICATIONS

Patent Abstracts of Japan, vol. 097, No. 011, Nov. 28, 1997, Publication No. 09175109, Application 07335403 of Matsumoto Hiroyuki, Abstract.
Patent Abstracts of Japan, vol. 017, No. 694 (M–1531) Dec. 17, 1993, Publication No. 05238206, Application 04043727 of Horiuchi Mamoru, Abstract.

* cited by examiner

*Primary Examiner*—Michael W. Ball
*Assistant Examiner*—Justin Fischer
(74) *Attorney, Agent, or Firm*—Baker Botts L.L.P.

(57) ABSTRACT

A tire with radial carcass reinforcement having a maximum axial width $S_0$ and including a crown reinforcement composed of at least two working crown plies of inextensible reinforcing elements, crossing from one ply to the next at angles of between 10° and 45° to the circumferential direction, the said plies having axial widths equal to at least 80% of the width $S_0$, and arranged radially between the said working plies, an additional ply of reinforcing elements essentially parallel to the circumferential direction, the working plies having widths greater than the width of the additional ply by at least 16% of the width $S_0$, and being on both sides of the equatorial plane and in the immediate axial extension of the additional ply coupled over an axial distance equal to at least 3% of the width $S_0$, thereafter being separated by a section of rubber mix having a thickness of at least 2 mm.

11 Claims, 2 Drawing Sheets

CROWN REINFORCEMENT FOR HEAVY DUTY TIRES

This is a continuation of PCT/EP98/06798, filed Oct. 27, 1998.

BACKGROUND OF THE INVENTION

The present invention concerns a tire with radial carcass reinforcement anchored on both sides to at least one bead wire and having a crown reinforcement consisting of at least two superimposed working plies composed of parallel cords or cables in each ply and crossing from one ply to the next at angles with respect to the circumferential direction of the tire of at most 45° in absolute value.

More particularly it concerns a "Heavy Duty" type of tire, whose ratio of height at rim H to maximum axial width S is equal to at most 0.80, and is intended to be fitted to medium to high tonnage vehicles, such as lorries, buses, trailers, etc.

Some present-day so-termed "highway" tires are designed to run at high speeds and over increasingly long distances, due to improved road networks and the world-wide growth in motorway networks. The overall conditions under which such a tire is called upon to operate undoubtedly allows a greater number of kilometres to be covered, since the tire wear is less severe; on the other hand, the fatigue strength of the tire and of the crown reinforcement in particular are taxed more severely.

Patent FR 2 419 185 makes it clear that the type of tire in question, with a low H/S ratio, while offering numerous advantages, also has a number of drawbacks, such as poor adhesion of the equatorial area of the tread or a concentration of high pressures in the area of the edges of the tread, due to reduced contact area in the longitudinal direction of the tire. In order to overcome the said drawbacks, the above-mentioned French patent recommends the provision between the carcass reinforcement and the radially internal working ply, in two areas remote from the equatorial plane, of two limiting blocks each composed of two superimposed plies of inextensible cables, crossing from one ply to the next at opposing angles with respect to the circumferential direction, the said angles being equal in absolute value to at most one-half of the smallest angle used in the working plies and above 0°.

The implementation of the solution outlined above, its application to a tire with a shape ratio H/S equal to at most 0.80, in particular equal to at most 0.6, and intended to be fitted to a "heavy goods vehicle", does not allow a crown reinforcement with a satisfactory fatigue strength to be obtained.

The lack of fatigue strength relates to both the fatigue strength of the crown plies, and in particular the resistance to separation between the edges of the plies, and the fatigue strength of the cables in the part of the carcass reinforcement situated below the crown reinforcement, the former deficiency being heavily influenced by the operating temperatures prevailing at the margins of the working plies, whether the tire is running in a straight line or cornering.

The objective of French patent application 94/015736 is to improve the fatigue strength of the crown reinforcement of a "heavy goods vehicle" tire having a shape ratio equal to at least 0.60. the said reinforcement comprising at least two working crown plies made from inextensible cables, crossing from one ply to the next at angles of between 10° and 45° to the circumferential direction, the said plies having widths equal to at least 80% of the maximum axial width $S_0$ of the carcass reinforcement. It proposes to make provision, firstly, between the carcass reinforcement and the working ply radially closest to the axis of rotation, for an axially continuous ply formed from inextensible metallic cables making an angle of at least 60° with respect to the circumferential direction, and whose axial width is equal to at least the axial width of the shortest working crown ply, and secondly between the two working crown plies an additional ply formed from metallic elements and arranged essentially parallel to the circumferential direction, the axial width of the said ply being equal to at least 0.7 $S_0$, and its modulus of elasticity in tension being at most equal to the modulus of elasticity of the most extensible working ply.

French patent application FR 96/02178, which aims to lower the operating temperature of a "heavy goods vehicle" type of tire with radial carcass reinforcement, while offering a solution that is at once effective and economical, recommends adding to the said carcass reinforcement a crown reinforcement comprising at least two working crown plies made from inextensible cables, crossing from one ply to the next at angles of between 10° and 45° to the circumferential direction, and comprising in addition, in the absence of any ply formed from inextensible cables at an angle greater than 45° to the circumferential direction, an axially continuous additional ply formed from metal elements arranged essentially parallel to the circumferential direction and positioned radially between the working plies, the said additional ply having an axial width equal to at least 1.05 times the axial width of the widest working crown ply.

While the problems of separation between the working plies and the fatigue strength of the cables in the carcass reinforcement appear to be resolved in one case, and while the operating temperatures are greatly reduced in the other, the long haulage distances covered by tires constructed in this way lead to the appearance of fatigue fractures in the cables of the additional ply and more especially at the edges of the said ply, whether or not the so-termed triangulation ply is present.

It is always possible to change the reinforcing elements, and in particular to choose cables of a different construction or cables with a higher tensile strength. The above solution, while certainly simple, is always costly.

SUMMARY OF THE INVENTION

To overcome the above drawbacks and to improve the fatigue strength of the crown reinforcement of the type of tire in question without raising its cost, the tire with radial carcass reinforcement having a maximum axial width $S_0$, according to the invention, comprising a crown reinforcement composed of at least two working crown plies of inextensible reinforcing elements crossing, from one ply to the next at angles of between 10° and 45° to the circumferential direction, the said plies having axial widths equal to at least 80% of the width $S_0$ and, arranged radially between the said working plies, an additional ply of reinforcing elements essentially parallel to the circumferential direction, is characterized by the fact that the working plies of widths greater than the width of the additional ply by at least 16% of the width $S_0$ are, on both sides of the equatorial plane and in the immediate axial extension of the additional ply, coupled over an axial distance equal to at least 3.5% of width $S_0$, thereafter being separated by sections of a rubber mix over at least the remainder of the width common to the said working plies.

The thickness of the separating profiles between the plies, measured opposite the ends of the narrowest working ply, are equal to at least 2 mm and preferably greater than 2.5 mm.

The term 'coupled plies' should be understood to mean plies whose respective reinforcing elements are separated radially by at most 1.5 mm, the said thickness of rubber being measured radially between respectively the upper and lower generatrices of the said reinforcing elements.

The term 'inextensible element' should be understood to mean an element, cable or monofilament, that has a relative elongation of less than 0.2% when subjected to a tensile force equal to 10% of the breaking load. In the case of the tire considered, the inextensible reinforcing elements are preferably inextensible steel cables.

Reinforcing elements, cords or cables, arranged essentially parallel to the circumferential direction, are elements that form angles with the said direction in the range +2.5° to −2.5° with respect to 0°.

The additional ply advantageously has a modulus of elasticity in tension at most equal to the modulus of elasticity in tension of the most extensible working ply. A modulus of elasticity in tension of a ply of cables results from the tensile stress exerted along the direction of the cables, necessary to obtain a given relative elongation $\epsilon$, the said modulus being a tangential modulus. The expression modulus of elasticity of the additional ply at most equal to the modulus of elasticity of the most extensible working ply'should be understood to mean the tangential modulus of the additional ply, irrespective of the relative elongation, the most extensible ply being the ply which, for any value of the tensile stress, exhibits a relative elongation greater than that of the other ply under the same stress.

Advantageously and in order to facilitate the manufacture of the tire, the modulus of the additional ply will be such that it is low for a relative elongation of between 0% and 0.4%. and at most equal to the highest modulus of elasticity in tension of the most extensible working ply for relative elongations greater than 0.4%.

The working plies are generally of unequal axial widths. The radially outermost working ply can be axially narrower than the radially innermost working ply: it is then advantageous for the crown reinforcement to have an additional radially external ply, known as the protective ply, composed of so-termed elastic reinforcing elements arranged at an angle of between 10° and 45° to the circumferential direction and having the same orientation as the angle formed by the inextensible elements of the narrowest working ply. The said protective ply can have an axial width smaller than the axial width of the narrowest working ply, and either not cover or totally or partially cover the coupling zone between the two working crown plies. The said protective ply can also have an axial width greater than the axial width of the narrowest working ply, such that it covers the edges of the narrowest working ply and is coupled, in the axial extension of the additional ply, with the widest working crown ply over an axial distance equal to at least 2% of width $S_0$, thereafter being separated axially on the outside from the said widest working ply by sections of a thickness equal to at least 2 mm. The protective ply formed from the elastic reinforcing elements can, in the case described above, be on the one hand possibly separated from the edges of the said narrowest working ply by sections of an appreciably smaller thickness than the thickness of those separating the edges of the two working plies, and on the other hand have an axial width smaller or greater than the axial width of the widest crown ply.

Irrespective of the solution described above, it is advantageous to supplement the crown reinforcement, radially on the inside between the carcass reinforcement and the radially internal working ply closest to the said carcass reinforcement, by a triangulation ply of inextensible reinforcing elements forming an angle with the circumferential direction greater than 60° and having the same orientation as the angle formed by the reinforcing elements of the ply radially closest to the carcass reinforcement. The said triangulation ply can have an axial width smaller than the said widest working ply, which is, in the crown reinforcement under consideration, radially closest to the carcass reinforcement. The said triangulation ply can also have an axial width greater than the width of the widest working ply, and it is then advantageous for the radially external so-termed protective ply, coupled to the widest working ply, to be also coupled, in the immediate axial extension of the widest working ply, to the said triangulation ply over an axial distance at least 0.02 times the width $S_0$ of the carcass reinforcement, thereafter being separated axially on the outside from the edges of the said triangulation ply by sections having a thickness equal to at least 2 mm. The protective ply formed from the elastic reinforcing elements can then be separated from the edges of the said narrowest working ply, as previously, by sections of appreciably smaller thickness than the thickness of those separating the edges of the two working plies. The said protective ply can also be wider or narrower than the triangulation ply.

The radially outermost working ply can be axially wider than the radially innermost working ply: it is then advantageous for the crown reinforcement to be supplemented internally by a triangulation ply of inextensible reinforcing elements forming an angle with respect to the circumferential direction greater than 60° and having the same orientation as the angle of the reinforcing elements of the narrowest ply. The so-called triangulation ply can have an axial width smaller than the axial width of the narrowest working ply, i.e. the ply radially closest to the carcass reinforcement. By preference, the said triangulation ply will have an axial width greater than the width of the narrowest working ply and a width such that it is coupled, in the axial extension of the narrowest working ply, with the widest working ply over an axial distance at least 0.02 times the width $S_0$, thereafter being separated from the edges of the said ply by means of sections of rubber-like mix at least 2 mm thick, regardless of whether it is the triangulation ply or the widest working ply that has the greatest width.

The crown reinforcements just described, with the working ply furthest from the carcass reinforcement being axially the widest, can also be supplemented, radially on the exterior of the said widest working ply, by a protective ply of elastic reinforcing elements arranged at an angle with respect to the circumferential direction of between 10° and 45° and having the same orientation as the angle of the elements of the radially widest working ply. The said protective ply can have an axial width smaller than the width of the narrowest working ply, and cover, totally or partially, the coupling zone between the two working crown plies. It can also be wider than the narrowest working ply and narrower than the widest working ply, but it will preferably have an axial width such that it radially covers the edges of the widest working ply, being possibly separated from the said edges by sections of a thickness that can be smaller than the thickness of the sections separating the edges of the narrowest working ply from the widest working ply, thereafter being coupled, in the axial extension of the narrowest working ply with the radially internal triangulation ply formed from steeply inclined inextensible elements over an axial distance equal to at least 2% of the width $S_0$, and then separated from the edges of the said triangulation ply by rubber-like sections of a thickness of at least 2 mm, regardless of whether it is the triangulation ply or the protective ply that is the wider.

DESCRIPTION OF THE DRAWINGS

The characteristics and advantages of the invention will be better understood from the description presented below with reference to the drawings, which illustrate in a non-limiting manner some example embodiments, and in which.

DESCRIPTION OF PREFERRED EMBODIMENTS

Figure 1:
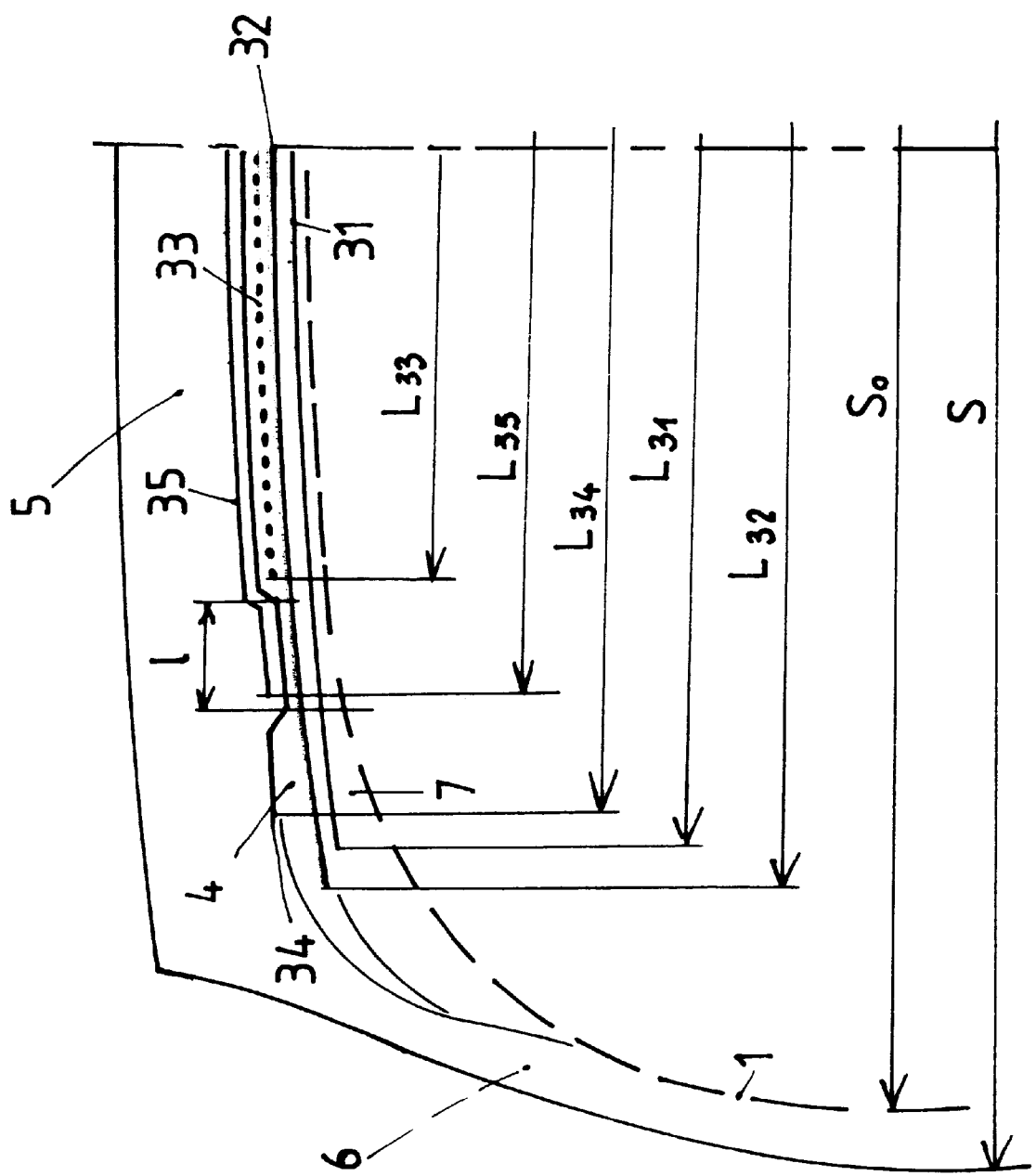
FIG. 1 is a schematic representation, seen in meridian section, of a preferred first variant of a crown reinforcement according to the invention.

In FIG. 1, a tire $P_A$, of size 495/45 R 22.5 X, has a shape ratio H/S equal to 0.45, H being the height of tire $P_A$ on the mounting rim and S the maximum axial width. The said tire $P_A$ comprises a radial carcass reinforcement 1 anchored at each bead to at least one bead wire by forming a turn-up, and composed of a single ply of metal cables. This carcass reinforcement 1 is hooped by a crown reinforcement, comprising radially, from the inside to the outside:

a first triangulation ply 31, of inextensible metal cables arranged at an angle δ of 65° with respect to the circumferential direction, radially above and covering the preceding triangulation ply, a first working ply 32 composed of inextensible metal cables arranged at an angle α, equal in the case shown to 18° and having the same orientation as the angle δ of the elements of the triangulation ply.

surmounting the first working ply 32, an additional ply 33 composed of sections or groups of sections of cable, each having a circumferential length roughly equal to ⅙ of the circumferential length of the ply 33, and the said elements being arranged at 0°, while the spaces between the sections are offset with respect to each other, then a second working ply 34 composed of metal cables identical to those in the first working ply 32 and forming with respect to the circumferential direction an angle β, opposed to angle α and, in the case shown, equal to the said angle α of 18° (but which may be different from the said angle α), and lastly a final ply of elastic cables 35 arranged with respect to the circumferential direction at an angle γ, having the same orientation as angle β and equal to the said angle β (but which may be different from the said angle), the latter ply being a protective ply.

The axial width $L_{32}$ of the first working ply 32 is equal to 0.87 times the maximum axial width $S_0$ of the central fiber of the carcass reinforcement 1, i.e. 416 mm, which is, for a tire of usual shape, appreciably smaller than the width $L_1$ of the tread, which is equal in the case in question to 430 mm. The axial width $L_{34}$ of the second working ply 34 is equal to 0.83 times the maximum axial width $S_0$, i.e. 400 mm. Triangulation ply 31 has an axial width $L_{31}$ intermediate between the respective widths of the two working plies 32, 34 and in this case equal to 408 mm. The axial width $L_{33}$ of additional ply 33 is equal to 320 mm. In fact, the width $L_{33}$ of additional ply 33 is smaller than width $L_{33}$ ($L_{34}$) of the narrowest working ply, while being of sufficient width to contribute effectively to reducing the operating temperatures of the tire in the vicinity of the ends of the working crown plies, which are the areas most prone to overheating, and the separations between plies. The final crown ply 35, the so-termed protective ply, has a width $L_{35}$ roughly equal to 370 mm.

On each side of the equatorial plane and axially in the extension of the additional ply 33, the two working plies 32 and 34 are coupled over an axial width l, in this case equal to 17 mm: the cables of the first working ply 32 and the cables of the second working ply 34, over the axial coupling width l, are separated radially from each other by a layer of rubber whose thickness is minimal and corresponds to double the thickness of the rubber-like layer covering the hooped metal cables 27.23 of which each working ply 32, 34 is formed, i.e. 0.8 mm. Over the remaining width common to the two working plies, i.e. approximately 20 mm on each side, the two working plies 32 and 34 are separated by a rubber section 4 roughly triangular in shape, the thickness of the said section 4 increasing from the axial end of the coupling zone to the end of the narrowest working ply and attaining at the said end a thickness of 4 mm. The said section 4 has a sufficient radial width to cover the end of the widest working ply 32, which is in this case the working ply radially closest to the carcass reinforcement. The tire crown is finished off with a tread 5 joined to the beads by two side-walls 6 and the triangulation ply radially adjacent to carcass reinforcement 1 on both sides of the equatorial plane rises from it axially towards the outside, the said ply being joined to the carcass reinforcement 1 by means of triangular-shaped rubber sections 7.

Figure 2:
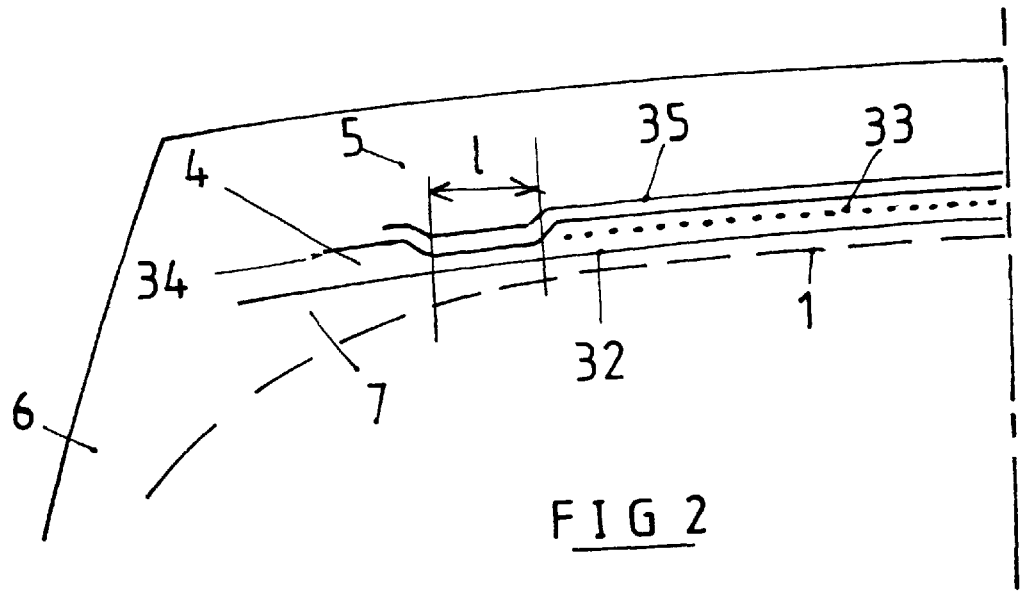
FIG. 2 shows a preferred second variant according to the invention.

Tire $P_B$ in FIG. 2, of size 315/80 R 22.5 X, has a shape ratio H/S equal to 0.8, H being the height of tire $P_B$ on the mounting rim and S its maximum axial width. The structure of the crown reinforcement of the said tire $P_B$ differs from that described previously by the absence of the so-called triangulation ply. Thus, the carcass reinforcement 1, anchored at each bead to at least one bead wire by forming a turn-up and composed to a single ply of metal cables, is hooped by crown reinforcement, comprising radially, from the inside to the outside:

a first working crown ply 32 composed of steel inextensible metal cables arranged at an angle a equal in the case shown to 18°, radially adjacent to and parallel to the carcass reinforcement 1 in its median part, whose edges are separated from the said carcass reinforcement by rubber sections 7 which increase in thickness axially from inside to outside.

surmounting the first working ply 32, an additional ply 33 composed of discontinuous metal elements made of inextensible steel and of circumferential length roughly equal to ⅙ of the circumferential length of ply 33, the said elements being arranged at 0°, the axially external edges of the first working crown ply being separated from the additional ply 33 of circumferential elements by layers of rubber of small thickness, then a second working crown ply 34 composed of metal cables identical to those in the first ply 32 and forming with respect to the circumferential direction an angle β in the opposite direction to angle α and, in the case shown, equal to the said angle α of 18° (but which may be different from the said angle α).

The axial width $L_{32}$ of the first working ply 32 is equal to 235 mm, which is, in the tire under consideration, slightly smaller than the width of the tread, which is equal, in the present case, to 235 mm. The axial width $L_{34}$ of the second working ply 34 is slightly smaller than the width $L_{32}$, being equal to 210 mm. The axial width $L_{33}$ of additional ply 33 is equal to 176 mm. Working plies 32 and 34 are, on both sides of the equatorial plane, in the extension of the additional ply 33, coupled over a distance l equal to 9 mm, which represents a little less than 0.03 times the maximum axial width of the carcass reinforcement 1, with the same definition of coupling as in the previous case: minimal thickness between the cables of the plies and equal in the present case to 1 mm. Over the remaining width shared by the two working plies, i.e. about 6 mm on each side. the two working plies 32 and 34 are separated by a triangular rubber section 4 having a thickness of 3 mm measured at the end of the narrowest working ply 34, the said section increasing in thickness from the axial end of the coupling zone to the end of the narrowest working ply. The crown reinforcement thus described is supplemented by a final ply 35 of so-called elastic steel cables arranged at an angle γ with respect to the circumferential direction and having the same orientation as angle β and equal to the said angle β (but which may be different), this final ply 35 being a so-called protective ply, and the so-called elastic cables being cables with a relative elongation at break equal to at least 4%. The axial width $L_{35}$ of the said ply 35 is essentially equal to 198 mm, so as to cover the coupling zones between the two working plies 32 and 34.

Figure 3:
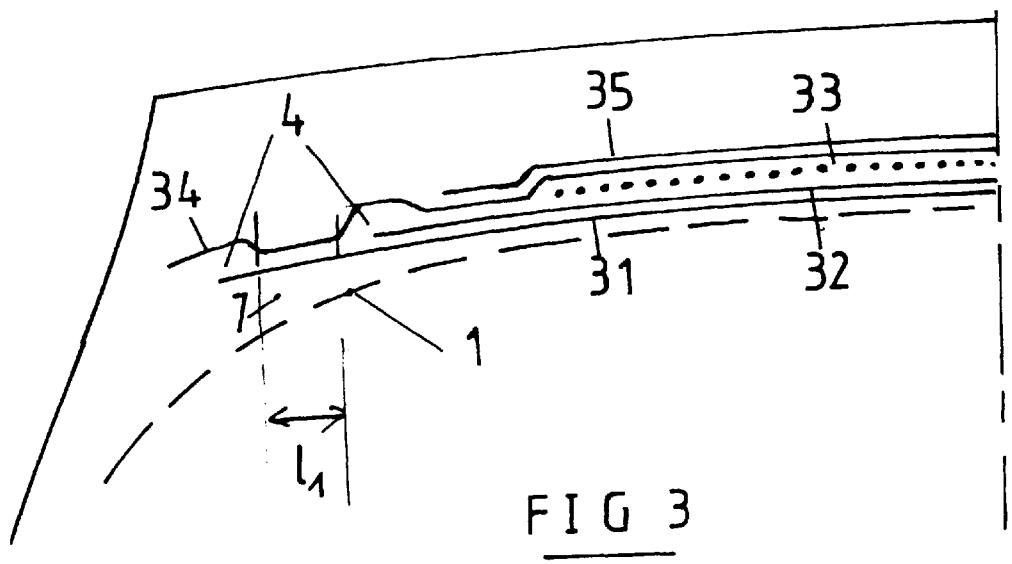
FIG. 3 shows in the same way a third variant.

The examples described and shown in FIGS. 1 and 2 relate to a single coupling zone between plies. The tire $P_C$, shown in FIG. 3, of the same size as the tire described in the first example, embodies to two coupling zones between plies. The structure of the crown reinforcement 3 of the said tire $P_C$ differs from that of tire $P_A$:

firstly, in that the axial widths of the two working plies 32 and 34 are inverted, secondly, in that the widths of the working plies 32 and 34 and the triangulation ply 31 are different, the additional ply 33 retaining the same width of 320 mm, but the width $L_{32}$ of the radially internal working ply 32 being made equal to 380 mm and the width $L_{34}$ of the radially external working ply 34 being made equal to 451 mm, so that the triangulation ply 31 of width $L_{31}$ equal to 431 mm is coupled, on each side of the equatorial plane, to the second working ply 34 in the axial extension of the first working ply 32 over a width $l_1$ roughly equal to 10 mm, the edges of the said triangulation ply 31 being then decoupled from the widest working ply 34 by sections 4 having a thickness of 4 mm. The said preferred variant makes it possible in particular to improve the resistance to separation between the edges of the working plies at the narrowest ply 32.

Although not shown, it is easy to imagine a tire $P_D$ identical to the tire $P_C$ previously described and comprising a crown reinforcement with a protective ply wider than the widest working ply, i.e. in the case under consideration the working ply radially furthest from the carcass reinforcement, and separated from the edges of the said working ply by sections made from a rubber-like mix having a thickness of 4 mm.

I claim:

1. A tire with radial carcass reinforcement having a maximum axial width $S_0$, comprising a crown reinforcement composed of at least two working plies of inextensible reinforcing elements, crossing from one ply to the next at angles of between 10° and 45° to the circumferential direction, the said working plies having axial widths equal to at least 80% of the width $S_0$, and, arranged radially between the said working plies, an additional ply of reinforcing elements essentially parallel to the circumferential direction, characterized in that the working plies, having widths greater than the width of the additional ply by at least 16% of the width $S_0$, on both sides of the equatorial plane and in the immediate axial extension of the additional ply, are coupled over an axial distance equal to at least 3.5% of the width $S_0$, being then separated by a section of rubber mix at least over the remainder of the width common to the two working plies.

2. A tire according to claim 1, characterized in that one of the working plies is the narrowest in width and in that the sections of rubber mix have, at the ends of the narrowest working ply, a thickness equal to at least 2 mm.

3. A tire according to claim 2, characterized in that the crown reinforcement, whose working plies have unequal axial widths, a radially outer working ply being axially narrower than a radially inner working ply, comprises also, radially on the outside of said working plies, a protective ply of elastic reinforcing elements, arranged with respect to the circumferential direction at an angle of between 10° and 45° and having the same orientation as the angle formed by the inextensible elements of the narrowest working ply, the said protective ply having an axial width smaller than the axial width of the narrowest working ply.

4. A tire according to claim 2, characterized in that the crown reinforcement, whose working plies have unequal axial widths, the radially outer working ply being axially narrower than the radially inner working ply, comprises also, radially on the outside of the working plies, a protective ply of elastic reinforcing elements, arranged at an angle with respect to the circumferential direction of between 10° and 45° and having the same orientation as the angle formed by the inextensible elements of the narrowest working ply, the said protective ply having an axial width, such that it radially covers the edges of the narrowest working ply, and that it is then, in the axial extension of the additional ply, coupled with the widest working crown ply over an axial distance equal to at least 2% of the width $S_0$, thereafter being separated axially on the outside from the said widest working ply by sections of rubber mix at least 2 mm in thickness.

5. A tire according, to claim 4, characterized in that the radially outer protective ply composed of elastic reinforcing elements is separated from the edges of the said narrowest working ply by sections having a thickness smaller than the thickness of the sections separating the edges of the two working plies.

6. A tire according to claim 1, characterized in that the crown reinforcement includes a widest working ply and additionally comprises, radially on the inside, between the carcass reinforcement and the radially inner working ply, a ply of inextensible reinforcing elements forming an angle with respect to the circumferential direction greater than 60°, having the same orientation as the angle of the reinforcing elements of the radially inner working ply, and an axial width smaller than the axial width of the widest working ply.

7. A tire according to claim 5, characterized in that the crown reinforcement additionally comprises radially on the inside, between the carcass reinforcement and the radially inner working ply, a triangulation ply of inextensible reinforcing elements forming an angle with respect to the circumferential direction greater than 60° and having the same orientation as the angle of the reinforcing elements in the radially inner working ply, the axial width of said triangulation ply being greater than the width of the widest working ply, and in which the protective ply is coupled to the widest working ply and has a width such that it is also coupled, in the immediate axial extension of the widest working ply, to the said triangulation ply over an axial distance at least 0.02 times the width $S_0$ of the carcass reinforcement, thereafter being separated axially on the outside from the edges of the said triangulation ply by sections of rubber mix having a thickness of at least 2 mm.

8. A tire according to claim 2, characterized in that the crown reinforcement, whose working plies are of unequal widths, the radially outermost working ply being axially wider than the radially innermost working ply, comprises also a triangulation ply of inextensible reinforcing elements forming an angle with respect to the circumferential direction greater than 60°, and having the same orientation as the angle of the reinforcing elements of the narrowest ply, and whose axial width is smaller than the width of the narrowest working ply.

9. A tire according to claim 2, in which the crown reinforcement, whose working plies are of unequal widths, the radially outermost working ply being axially wider than the radially innermost workings ply, comprises also a triangulation ply of inextensible reinforcing elements forming an angle with respect to the circumferential direction greater than 60°, and having the same orientation as the angle of the reinforcing elements of the narrowest ply, the width of the triangulation ply being greater than the width of the narrowest working ply, tile working ply with the larger width being, in the immediate extension of the narrowest working ply, coupled with the triangulation ply over an axial distance at least 0.02 times the width $S_0$ of the carcass reinforcement, thereafter being separated from the edges of the said triangulation ply by means of sections made from a rubber-like mix and having a thickness of at least 2 mm.

10. A tire according to claim 9, in which the crown reinforcement includes, radially on the exterior of the widest working ply, a protective ply of elastic reinforcing elements arranged at an angle with respect to the circumferential direction of between 10° and 45° and having the same orientation as the angle formed by the inextensible elements of the widest working ply.

11. A tire according to claim 10, in which the said protective ply has an axial width such that it radially covers the ends of the widest working ply and, in the immediate extension of the narrowest working ply, it is coupled with the radially internal ply of inextensible elements at an angle greater than 60° inclined/over an axial width to at least 2% of the width $S_0$ thereafter being separated from the edges of the said triangulation ply by rubber-like sections having a thickness of at least 2 mm.

* * * * *

UNITED STATES PATENT AND TRADEMARK OFFICE
CERTIFICATE OF CORRECTION

PATENT NO. : 6,401,778 B1
DATED : June 11, 2002
INVENTOR(S) : Guy Cluzel

It is certified that error appears in the above-identified patent and that said Letters Patent is hereby corrected as shown below:

<u>Title page,</u>
Item [73], Assignee, "Generale" should read -- Générale --; and "establissements" should read -- Etablissements --

<u>Column 3,</u>
Line 22, "modulus" should read -- 'modulus --
Line 24, "ply'should" should read -- ply' should --

<u>Column 4,</u>
Line 15, "$S_0$of" should read -- $S_0$ of --

<u>Column 6,</u>
Line 42, "a" should read -- $\alpha$ --

<u>Column 8,</u>
Line 41, "according," should read -- accorrding --

<u>Column 9,</u>
Line 20, "workings" should read -- working --

<u>Column 10,</u>
Line 19, "elements at" should read -- elements inclined at --
Line 20, "inclined/over" should read -- over --

Signed and Sealed this

Twenty-first Day of January, 2003

JAMES E. ROGAN
*Director of the United States Patent and Trademark Office*